(12) United States Patent
Klimek

(10) Patent No.: US 8,439,412 B2
(45) Date of Patent: May 14, 2013

(54) MOTOR VEHICLE FORWARD STRUCTURE

(75) Inventor: Stanislaw Klimek, Frankfurt am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 13/019,693

(22) Filed: Feb. 2, 2011

(65) Prior Publication Data

US 2011/0193356 A1    Aug. 11, 2011

(30) Foreign Application Priority Data

Feb. 5, 2010  (DE) .......................... 10 2010 006 976

(51) Int. Cl.
*B60R 19/34*    (2006.01)

(52) U.S. Cl.
USPC ........... 293/133; 293/146; 293/148; 293/152; 296/187.09

(58) Field of Classification Search ................... 293/133, 293/148, 151, 152, 146, 154, 155; 296/187.09, 296/203.02
See application file for complete search history.

(56) References Cited

U.S. PATENT DOCUMENTS

| | | | |
|---|---|---|---|
| 4,413,856 A | 11/1983 | McMahan et al. | |
| 5,031,947 A * | 7/1991 | Chen | 293/135 |
| 5,611,568 A | 3/1997 | Masuda | |
| 6,957,846 B2 | 10/2005 | Saeki | |
| 6,959,950 B2 | 11/2005 | Bladow et al. | |
| 7,044,516 B2 | 5/2006 | Kobayashi et al. | |
| 7,681,943 B2 | 3/2010 | Murata et al. | |
| 7,735,902 B2 | 6/2010 | Wurtemberger | |
| 7,748,507 B2 | 7/2010 | Canot et al. | |
| 7,815,245 B2 | 10/2010 | Hiraishi et al. | |
| 7,857,367 B2 | 12/2010 | Narducci et al. | |
| 8,056,685 B2 | 11/2011 | Canot et al. | |
| 8,118,346 B2 | 2/2012 | Ginja et al. | |
| 8,152,211 B2 | 4/2012 | Klimek | |
| 8,172,286 B2 | 5/2012 | Klimek | |
| 8,215,705 B2 | 7/2012 | Gonin | |

(Continued)

FOREIGN PATENT DOCUMENTS

| | | |
|---|---|---|
| AU | 2002358415 B2 | 4/2008 |
| DE | 102004056956 A1 | 7/2005 |

(Continued)

OTHER PUBLICATIONS

British Patent Office, British Search Report for British Application No. 1101354.7, dated Apr. 15, 2011.

(Continued)

*Primary Examiner* — Glenn Dayoan
*Assistant Examiner* — Melissa A Black
(74) *Attorney, Agent, or Firm* — Ingrassia Fisher & Lorenz, P.C.

(57) ABSTRACT

A motor vehicle forward structure is provided with at least two vehicle chassis beams, at least two crash boxes, which are arranged at the front ends of the vehicle chassis beams, and at least one transverse beam structure, which is secured to the crash boxes. The transverse beam structure exhibits two transverse bumper carriers with a first transverse bumper carrier above the crash boxes, and a second transverse bumper carrier below the crash boxes. The crash boxes are fixed in a left and right end area of the transverse beam structure, between the transverse bumper carriers and at the ends of the vehicle chassis beams.

7 Claims, 3 Drawing Sheets

Fig. 3

U.S. PATENT DOCUMENTS

| | | |
|---|---|---|
| 8,235,433 B2 | 8/2012 | Gonin |
| 8,276,955 B2 | 10/2012 | Baccouche et al. |
| 2009/0200811 A1 | 8/2009 | Erzgraeber et al. |
| 2011/0156414 A1 | 6/2011 | Gonin et al. |
| 2011/0193357 A1 | 8/2011 | Klimek |
| 2011/0193370 A1 | 8/2011 | Klimek |
| 2011/0193371 A1 | 8/2011 | Klimek |
| 2012/0049571 A1 | 3/2012 | Katou et al. |

FOREIGN PATENT DOCUMENTS

| | | |
|---|---|---|
| DE | 102005025353 A1 | 12/2006 |
| DE | 102007001966 A1 | 7/2008 |
| EP | 0908356 A1 | 4/1999 |
| EP | 1293389 A1 | 3/2003 |
| EP | 1535804 A1 | 6/2005 |
| EP | 2241480 A1 | 10/2010 |
| JP | 2002067839 A | 3/2002 |
| JP | 2004330948 A | 11/2004 |
| WO | 2006103326 A1 | 10/2006 |
| WO | 2007011238 A1 | 1/2007 |

OTHER PUBLICATIONS

German Search Report dated Oct. 15, 2010, issued in Application No. 102010006976.0.

* cited by examiner

MOTOR VEHICLE FORWARD STRUCTURE

CROSS-REFERENCE TO RELATED APPLICATION

This application claims priority to German Patent Application No. 102010006976.0, filed Feb. 5, 2010, which is incorporated herein by reference in its entirety.

TECHNICAL FIELD

The technical field relates to a motor vehicle forward structure with at least two vehicle chassis beams and at least two crash boxes, which are arranged at the front ends of the vehicle chassis beams, as well as at least one transverse beam structure, which is secured to the crash boxes.

BACKGROUND

Transverse beam structures are used in motor vehicles to increase safety and divert the impact energy to crash boxes as the energy absorbers. In addition, damage to the body structure of the motor vehicle can be kept down during low-speed accidents by using the transverse beam structure in conjunction with the crash boxes. To this end, the crash boxes are designed as deformation bodies, which are incorporated into the motor vehicle in such a way as to cushion the impact energy that arises when the motor vehicle collides with an obstacle via the transverse beam structure, and partially absorb it by deforming. As a result, the crash boxes diminish the transfer of impact energy to the body structure, in particular to the two vehicle chassis beams, and can thereby decrease or entirely prevent damage thereto.

Such a motor vehicle forward structure with a transverse beam structure and crash boxes is known from publication US 2009/0200811 A1. To this end, the known motor vehicle forward structure has a bumper system with a transverse bumper part arranged on a stiff frame, a flexible bumper sheath, a compressible structure arranged between an upper area of the sheath and the transverse bumper part and a support section that supports the lower area of the sheath, which in conjunction with a crash box that supports the transverse bumper part is fixed on an anchor plate of the stiff frame.

FIG. 5 shows a diagrammatic, perspective view of such a known motor vehicle forward structure. In this prior art, crash boxes 4 and 5 connected by a transverse bumper beam 9 are arranged on two vehicle chassis beams 2 and 3 at the ends 6 and 7 of the vehicle chassis beams 2 and 3 by means of an anchor plate 37. The disadvantage to the transverse bumper beam 9 according to prior art that connects the crash boxes 4 and 5, and hence the vehicle chassis beams 2 and 3, is that this continuous transverse bumper carrier 9 impedes the cool air streaming toward the vehicle forward structure, and diminishes the cooling effect on a radiator situated behind the transverse bumper beam 9 in the traveling direction.

At least one object is to overcome the disadvantages in prior art, and indicate a motor vehicle forward structure that exhibits an improved structural design and lower weight while retaining the same safety properties, in particular during low-speed accidents. In addition, other objects, desirable features and characteristics will become apparent from the subsequent summary and detailed description, and the appended claims, taken in conjunction with the accompanying drawings and this background.

SUMMARY

A motor vehicle forward structure is provided in one embodiment. This motor vehicle forward structure has at least two vehicle chassis beams and at least two crash boxes, which are arranged at the front end of the vehicle chassis beams. In addition, the motor vehicle forward structure has at least one transverse beam structure secured to the crash boxes. The transverse beam structure has two transverse bumper carriers with a first transverse bumper carrier above the crash boxes, and a second transverse bumper carrier below the crash boxes. The crash boxes are fixed in a left and right end area of the transverse beam structure, between the transverse bumper carriers and at the ends of the vehicle chassis beams.

The advantage to this motor vehicle forward structure in comparison to prior art is that the lower, second transverse bumper carrier makes the range of action of the crash boxes relative to the vehicle wheels lower than before. Another advantage lies in the fact that dividing the transverse beam structure into two transverse bumper carriers enables a distinct savings in weight relative to the vehicle forward structure. It is further advantageous that dividing the transverse beam structure into two transverse bumper carriers creates a gap between the lower and upper transverse bumper carrier, which permits an improved supply of cooling air for the cooling aggregate of the motor vehicle situated down-stream in the traveling direction.

In one embodiment, a bumper composite structure is fixed between the transverse bumper carriers. This bumper composite structure forms a spacing surface between the transverse bumper carriers, and divides the gap between the transverse bumper carriers into a left and right cooling air channel. As a result, this bumper composite structure has two effects, in that it can ensure that a centrally applied impact energy is diverted to the right and left end area of the transverse beam structure, and introduced into the crash boxes on the one hand, while the cooling air stream is advantageously guided via the left and right cooling air channel toward the radiator of the vehicle situated downstream in the traveling direction on the other.

The transverse bumper carriers preferably have a closed, oval hollow profile, as opposed to the angular hollow profile from the aforementioned prior art. This closed, oval hollow profile also improves the flow of cooling air to the radiator of the vehicle due to a diminished air flow resistance. In addition, this closed, oval hollow profile can be achieved via the inexpensive molding of a tubular profile, which clearly reduces the production costs by comparison to the known transverse bumper carrier 9 according to prior art.

Another embodiment provides that a longitudinal axis of the hollow profile of the first transverse bumper carrier be downwardly inclined toward the interior of the vehicle. Inclining the longitudinal axis of the closed, oval hollow profile of the transverse bumper carrier in this way increases mechanical stability while at the same time leaving the improved flow conditions for the cooling air intact.

In another embodiment, the second transverse bumper carrier is also twisted with its longitudinal axis relative to the road surface, so that the longitudinal axis of the hollow profile is upwardly inclined toward the interior of the vehicle. When combined with the inclination of the first transverse bumper carrier, this results in an increased inlet cross section for the cooling air, and a decreased outlet cross section of the latter, thereby producing a nozzle effect that advantageously intensifies a stream of cooling air toward the radiator.

This can be intensified even more by having the closed, oval hollow profile of the two transverse bumper carriers opposite the front side exhibit a conically increasing cross section. In addition, this conically increasing cross section can be used to provide a larger joining surface between the transverse bumper carriers and the crash boxes fixed between the two transverse bumper carriers in their end areas. The crash boxes are fixed in place with the transverse bumper carriers in their end areas by means of welding, hard soldering, or screws or rivets. As a consequence, the motor vehicle forward structure provides a higher compatibility given a vehicle crash with vehicles varying in mass and dimensions, wherein the greatest possible freedom is simultaneously achieved in terms of styling the motor vehicle forward structure for the front design comprised of engine hood, fender, radiator grill and headlamp structure.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
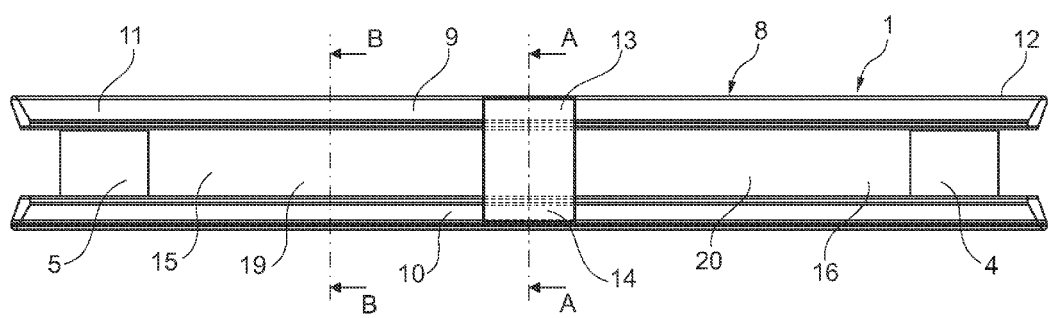
FIG. 1 shows a diagrammatic front view of a motor vehicle forward structure of an embodiment.

FIG. 1 shows a diagrammatic front view of a motor vehicle forward structure 1 according to an embodiment of the application. Only the so-called front impact structure of the motor vehicle forward structure for crash and cooling requirements is here depicted. All other forward structures like shock absorber panels, cooling air blinds and other design structures have here been omitted. The diagrammatic front view shown on FIG. 1 only depicts a transverse beam structure 8, which is designed as an impact or bumper structure. As opposed to the prior art shown above, this transverse beam structure 8 consists of an upper first transverse bumper carrier 9 and a lower second transverse bumper carrier 10, the end areas 11 and 12 of which are fixed on a respective crash box 4 or 5. This fixation can be established by welding, hard soldering or bolting. The crash boxes themselves are comprised of a flexible material, which deforms when absorbing the impact or collision energy during an accident, thereby dissipating impact energy, so that the vehicle chassis beams or vehicle body not shown on FIG. 1 are deformed at least at low speeds.

In addition, a bumper composite structure 14 in the central area 13 of the transverse beam structure 8 is depicted in this front view. This bumper composite plate 14 has a plate thickness of at least approximately 100 mm, and is intended to transmit the impact energy during a frontal collision to the two crash boxes 4 and 5 by way of the upper and lower transverse bumper carriers 9 and 10. This bumper composite plate 14 divides the gap between the transverse bumper carrier 9 and transverse bumper carrier 10, as well as between the two crash boxes 4 and 5, into a left cooling air channel 16 and a right cooling air channel 15, thus improving the supply of cooling air to a radiator depicted on the next FIG. 2. The next FIG. 2 shows the design of the two transverse bumper carriers 9 and 10.

Figure 2:
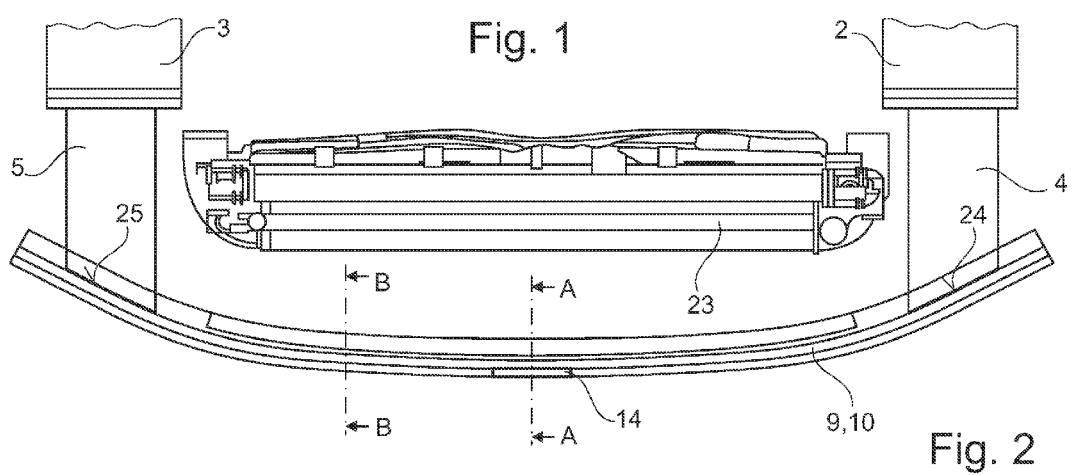
FIG. 2 shows a diagrammatic top view of the motor vehicle forward structure according to FIG. 1.

FIG. 2 shows a diagrammatic top view of the motor vehicle forward structure according to FIG. 1, wherein the body and engine components in this top view have been omitted, and only the outlines of the radiator structure 23 with the surrounding components of the front impact structure are visible. The upper and lower transverse bumper carriers 9 and 10 depicted on FIG. 1 form a slightly bent arc extending from one end area 11 to the other end area 12. This arced structure makes it possible to transmit collision forces, for example those centrally impacting the bumper composite plate 14, to the crash boxes 4 and 5 by way of the relatively stiff transverse bumper carriers 9 and 10. The front edges 24 and 25 of the crash boxes are adjusted to the arc-shaped profile of the transverse bumper carriers 9 and 10. Anchor plates 37 secure the crash boxes 4 and 5 with the front ends 6 and 7 of vehicle chassis beams 2 and 3, preferably via bolting. However, this connection between the anchor plates can also be firmly bonded through welding or hard soldering.

Figure 3:
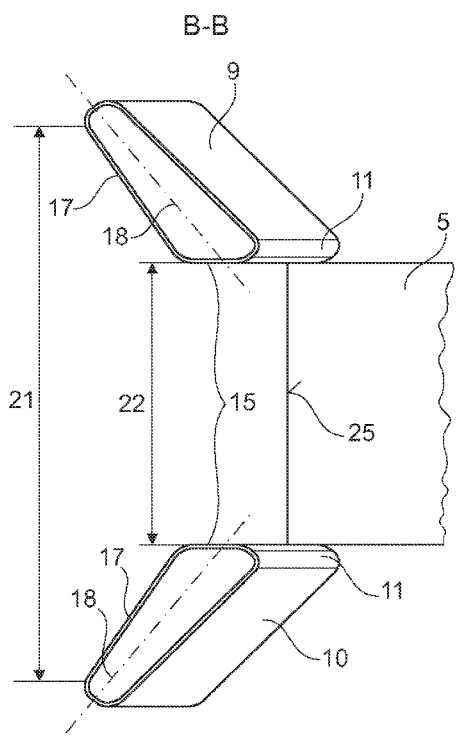
FIG. 3 shows a diagrammatic cross section through a transverse beam structure along sectional line B-B according to FIG. 1.

FIG. 3 shows a diagrammatic cross section through a transverse beam structure 8 according to FIG. 1 along the sectional line B-B. This cross section shows the oval profile of the first upper transverse bumper carrier 9 and the second lower transverse bumper carrier 10. The longitudinal axes 18 of the transverse bumper carriers 9 or 10 are aligned at an inclination relative to each other, so that the inlet cross section 21 is distinctly larger than the outlet cross section 22 toward the radiators depicted on FIG. 2. As a result, the transverse bumper carriers 9 and 10 act as a nozzle for the cooling air stream, allowing a more intensive flow to travel toward the radiator by way of the cooling air channels 15 and 16 depicted on FIG. 1. In addition, the oval-shaped hollow profile 17 of the transverse bumper carrier 9 and 10 exhibits a cross section that conically increases from the front side. This conically increasing cross section makes it easier to secure the crash boxes 4 and 5 depicted on FIGS. 1 and 2 between the transverse bumper carriers 9 and 10. To this end, the conical cross section is flattened at least in the fixation area of the crash boxes 4 and 5.

Figure 4:
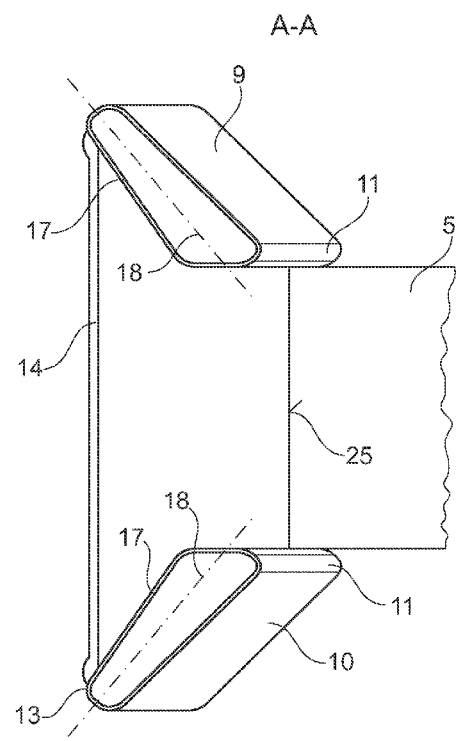
FIG. 4 shows a diagrammatic cross section through a transverse beam structure along sectional line A-A according to FIG. 1.
Figure 5:
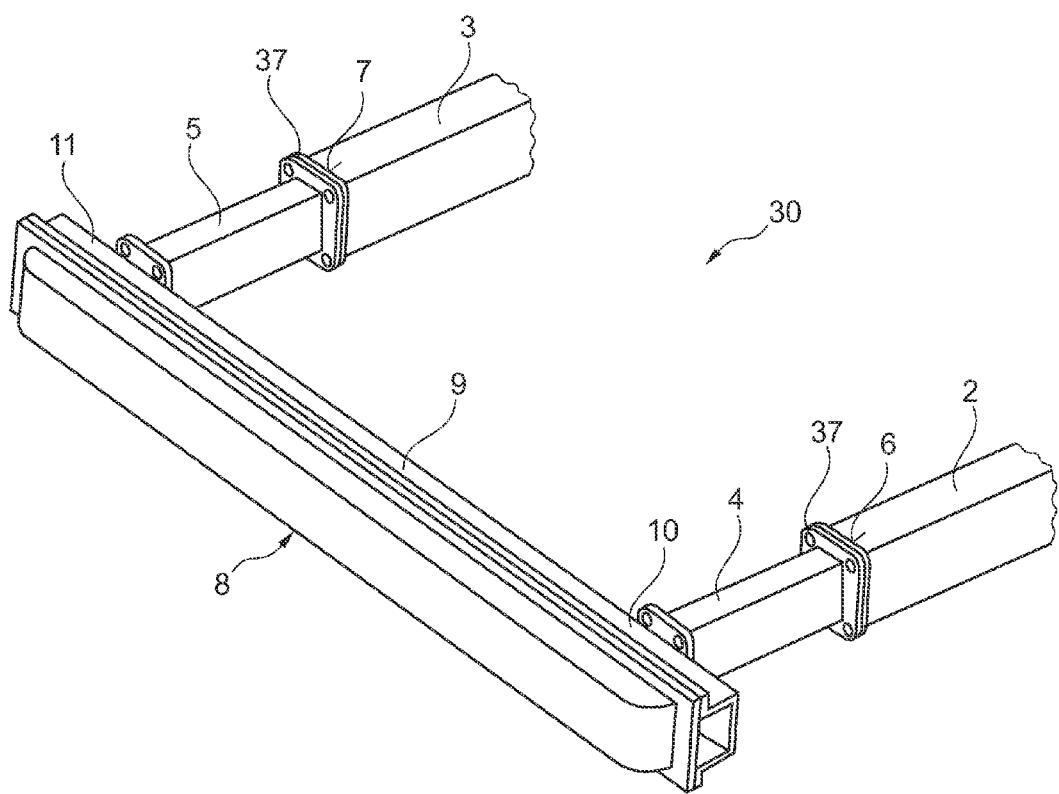
FIG. 5 shows a diagrammatic perspective view of a motor vehicle forward structure according to prior art.

FIG. 4 shows a diagrammatic cross section through a transverse beam structure 8 along the sectional line A-A according to FIG. 1. As already mentioned above, a bumper composite plate 14 is arranged in this area, which is fixed frontally to the transverse bumper carriers 9 and 10 via welding or hard soldering. This bumper composite plate 14 is massive, and has a minimum thickness of approximately 100 mm in this embodiment. While the crash boxes 4 and 5 can consist of honeycomb plastic areas at least in the interior, the transverse beam structure 8 is put together using a high-tensile and unbreakable metal or aluminum alloy.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A forward structure of a motor vehicle, comprising:
at least two vehicle chassis beams;
at least two crash boxes are arranged at front ends of the at least two vehicle chassis beams;
at least one transverse beam structure secured to the at least two crash boxes, the at least one transverse beam structure comprising:
a first transverse bumper carrier arranged above the at least two crash boxes;
a second transverse bumper carrier arranged below the at least two crash boxes, and
wherein the at least two crash boxes are fixed in a left end area and a right end area of the at least one transverse beam structure between the first transverse bumper carrier and the second transverse bumper carrier and at ends of the at least two vehicle chassis beams,
wherein the first transverse bumper carrier exhibits a closed and an oval-shaped hollow profile, and
a longitudinal axis of the oval-shaped hollow profile of the first transverse bumper carrier is downwardly inclined toward an interior of the motor vehicle.

2. The forward structure according to claim 1, wherein a bumper composite plate is fixed in a central area between the first transverse bumper carrier and the second transverse bumper carrier and divides a gap between the first transverse bumper carrier and the second transverse bumper carrier into a left cooling channel and a right cooling air channel.

3. The forward structure according to claim 1, wherein the second transverse bumper carrier exhibits a closed and an oval-shaped hollow profile.

4. The forward structure according to claim 3, wherein a longitudinal axis of the oval-shaped hollow profile of the second transverse bumper carrier is upwardly inclined toward an interior of the motor vehicle.

5. The forward structure according to claim 1, wherein the closed and the oval-shaped hollow profile of the first transverse bumper carrier opposite A front side exhibits a conically increasing cross section.

6. The forward structure according to claim 3, wherein the closed and the oval-shaped hollow profile of the second transverse bumper carrier opposite A front side exhibits a conically increasing cross section.

7. The forward structure according to claim 1, wherein the first transverse bumper carrier and the second transverse bumper carrier are configured such that the at least one traverse beam structure has a frontally enlarged inlet cross section.

* * * * *